United States Patent Office 3,249,424
Patented May 3, 1966

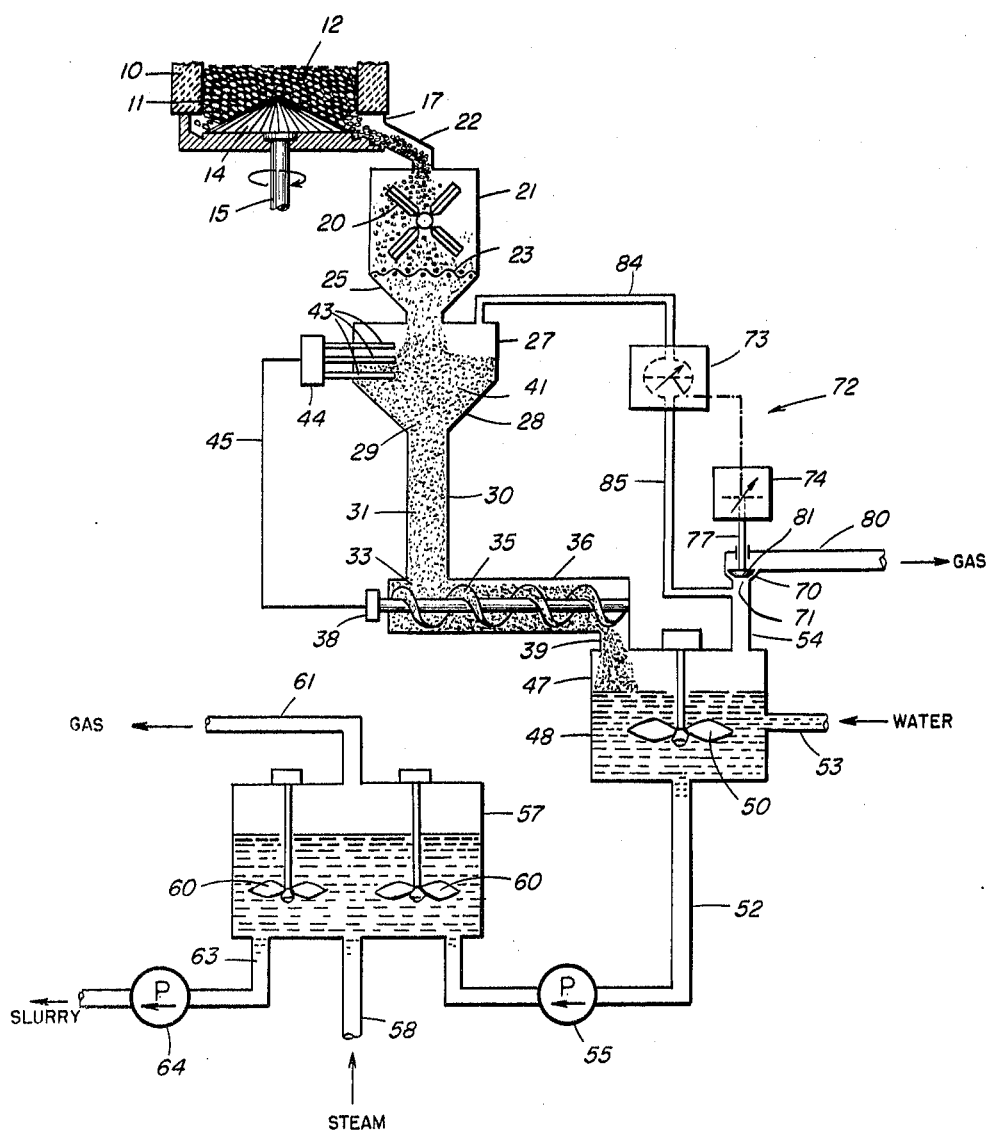

3,249,424
METHOD FOR CONVERTER RESIDUE
DISCHARGE
Norman W. F. Phillips and Bryan Rapson, Arvida,
Quebec, Canada, assignors to Aluminium Laboratories
Limited, Montreal, Quebec, Canada, a corporation of
Canada
Filed Dec. 11, 1962, Ser. No. 243,917
7 Claims. (Cl. 75—68)

This invention relates to the treatment of alloy materials from which aluminum has been extracted in accordance with the so-called aluminum subhalide distillation process, i.e. materials constituting the solid residue of aluminum-containing alloys which remains after removal of aluminum therefrom in a subhalide distillation system. More particularly, the invention relates to procedure and apparatus for effecting the discharge of these alloy residues from such a system and preparing the residues for disposal.

In the subhalide distillation of aluminum from alloys or like metallic materials containing aluminum together with other metals, as disclosed for example in United States Patent No. 2,937,082, the alloy material is exposed to a normal aluminum halide in gaseous state at an elevated temperature. The aluminum in the alloy reacts with the halide gas to form the subhalide of aluminum, as a gas, which is withdrawn and subjected to further treatment to yield purified aluminum metal. Thus, by way of example, the crude alloy obtained by direct reduction of bauxite or other aluminum ore, containing aluminum, iron, and other elements, may be heated, e.g. to a temperature ranging upwardly from about 1000° C., and exposed to aluminum trichloride gas (i.e., $AlCl_3$), whereby the aluminum in the alloy reacts with the gas to form aluminum monochloride gas (i.e., $AlCl$).

The foregoing operation, in accordance with preferred practice, is performed in a suitable converter or furnace having an upright confined converter chamber, to which the alloy is charged in granular form, viz. as fine particles, granules, and lumps ranging e.g. up to three inches in size, to provide a granular mass of alloy substantially filling the chamber. This mass, heated as by an electric current passed therethrough between suitably disposed electrodes in the converter, is exposed to aluminum trichloride gas flowing upwardly through the converter chamber from a gas inlet near the lower end of the chamber. The monochloride gas produced in the chamber, together with the unreacted portion of introduced trichloride gas, is withdrawn through a gas outlet located near the upper end of the chamber.

For continuous operation of the converter, fresh (i.e. unreacted) alloy granules are successively introduced to the top of the alloy mass in the chamber, while alloy granules are successively withdrawn from the lower end of the mass, so that the introduced granules move downwardly through the chamber under the force of gravity, exposed to the flow of trichloride gas in the chamber during such downward traverse. The granules are thus progressively depleted of aluminum, by reaction with the gas, as they advance toward the bottom or discharge end of the alloy mass. When they arrive at the lower end of the mass they are substantially exhausted of aluminum, and are discharged therefrom as a waste residue. This residue, consisting of granules corresponding in size to the alloy granules introduced to the converter (e.g. ranging from fine particles to lumps up to three inches in diameter), has a typical composition as follows:

| | Percent |
|---|---|
| Iron | 62 |
| Aluminum | 10 |
| Silicon | 11 |
| Titanium | 6 |
| Carbon | 10 |
| Other | 1 |

Removal of this residue alloy from the converter is conveniently effected with an upright extractor cone, rotating slowly on a vertical shaft, and positioned at the floor of the converter chamber so that the lower end of the alloy mass rests on the rotating cone surface. The granules of residue alloy comprising the lower end of the mass are carried by the rotation of the cone past an aperture in the converter wall or preferably a plurality of apertures spaced around the wall, such openings being here, for convenient brevity, considered as a single aperture. The rotary motion of the cone expels them through this aperture, while breaking up any large agglomerates of mutually adherent residue granules that may have formed in the mass, to reduce such agglomerates to a size that will pass through the aperture. As expelled from the aperture, the residue granules are at a temperature e.g. between 300° C. and 600° C., and are surrounded by aluminum trichloride gas escaping from the converter chamber together with the granules.

Although expulsion of residue granules from the converter, e.g. in a continuous fashion, may be accomplished with facility as by the foregoing procedure, the handling and disposal of the residue alloy after its withdrawal from the converter is attended with considerable difficulty. The residue contains water-active constituents such as aluminum carbide and phosphide (i.e. in addition to the component elements named above) which react with atmospheric water vapor to form toxic and otherwise undesirable gases; for example, the aluminum carbide reacts with water vapor to form methane, and the phosphide reacts with water vapor to form phosphine. The granules also carry gas from the converter atmosphere entrapped in their pores, including a proportion of hydrogen (e.g. 10% of the entrapped gas), which is dangerously combustible in air. Consequently, the granular residue as discharged from the converter cannot safely be exposed to the air. From the standpoint of convenience and economy of operation, however, it is obviously desirable that this residue be rendered safe for open-air handling and disposal; this is particularly true in the case of continuous operation of a subhalide system on any substantial scale, since such operation involves the successive expulsion of large quantities of such residue from the converter chamber of the system.

It is accordingly an object of the present invention to provide procedure and apparatus for effecting the discharge of such residue alloy from a subhalide converter, wherein the alloy is rendered safe for handling and disposal in the open air. Another object is to provide such procedure and apparatus for effecting discharge and disposal of the alloy in a facile, convenient, and substantially continuous manner.

Another particular object of the invention is to provide such procedure and apparatus wheerin the water-active, gas-forming constituents of the alloy are neutralized before exposure of the alloy to the air, so as to prevent formation of undesirably gases upon such exposure. A further object is to provide such procedure and apparatus wherein gases entrapped in pores of the alloy granules are driven off before exposure of the alloy to the air. A still further object is to provide for such alloy discharge without loss of aluminum trichloride gas from the converter chamber. Yet another object is to provide for such discharge without contamination of the converter chamber by gases evolved from the alloy during neutralization of the water-active constituents thereof.

To these and other ends, the process of the present invention in a broad sense contemplates comminuting the residue alloy granules expelled from the converter, mixing the comminuted alloy with aqueous liquid (e.g. water) to form a slurry, and treating the slurry, as by heating and agitation, to effect substantially complete reaction of the water-active constituents of the alloy with water in the slurry for evolution of the gaseous reaction products of such constituents, and to drive off entrapped gases carried in the alloy, while the alloy is maintained shielded from exposure to the air. Specifically, the above-described steps are carried forward in a closed, i.e. air-tight, system; that is to say, the alloy is conveyed from the discharge aperture of the converter, and the successive operations of comminution, slurry formation, and slurry treatment are performed, in an air-tight system communicating with the converter aperture, so as to prevent exposure of the alloy to the air until after treatment of the slurry is completed. The gases evolved from the slurry may be withdrawn from the system through conduits and disposed of as desired without intermixture of such gases with the air. After evolution of gas in the treating step is completed, the slurry may be discharged to the air, e.g. to an open-air slurry disposal pond; since substantially all gases which might be evolved by exposure of the alloy to the air have been driven off in the treating step, such disposal or other desired open-air handling of the slurry may be performed without danger. In other words, with the present process the alloy is neutralized (i.e. with respect to its gas-producing propensities) while shielded from exposure to the air, and thereby rendered capable of safe open-air disposal in the form of a slurry.

As mentioned above, aluminum trichloride gas from the converter atmosphere passes through the discharge aperture of the converter together with the expelled residue alloy granules. If this gas is permitted to advance with the alloy through the aforementioned closed system to the locality of slurry formation and treatment, it may escape through the conduits provided for discharge of gaseous reaction products of the slurry treatment, with resultant loss of trichloride gas from the subhalide system, a consequence undesirable from the standpoint of economy. Moreover, if gases evolved in the neutralization of allow in the slurry, e.g. methane and phosphine, are permitted to pass upwardly through the closed system, they may enter the converter aperture and contaminate the atmosphere in the converter chamber.

Accordingly, the present process in its more specific aspects includes the step of establishing a so-called dust seal in the path of the alloy as advanced through the closed system from the converter, effective to prevent gas from passing in either direction through the system. This is accomplished by advancing the alloy in comminuted form (i.e. after performance of the comminution step but before the slurry-formation step) through an elongated confined region, which forms part of the above-mentioned closed system, and controlling the rate of alloy advance through this region to maintain the region substantially filled with comminuted alloy particles, as a loosely packed mass. The particles size of comminuted alloy and the internal dimensions of the confined region are mutually selected so that, while the alloy particles can advance through this region, the loosely packed mass of advancing particles in the region effectively inhibits gas flow from either end of the region to the other. Thus, aluminum trichloride gas from the converter aperture cannot advance beyond this region to the localities of slurry formation and treatment; and gases formed in the slurry cannot advance from the latter localities to the converter aperture, the dust seal being positioned therebetween.

As a further feature of the present invention, gas is controllably discharged from the portion of the closed system adjacent the lower end of the dust seal (i.e. the extremity remote from the converter aperture), responsive to changes in the difference between the gas pressure at this locality and the gas pressure at the upper end of the dust seal, in such manner as to maintain these gas pressures at the opposite ends of the dust seal substantially equal to each other and thus to enhance the effectiveness of the dust seal in preventing passage of gas. The gas pressure at the upper end of the dust seal is, of course, provided by aluminum trichloride gas communicating through the converter aperture into the upper portion of the aforementioned closed system. The gas pressure at the lower end of the seal is provided by gases evolved from the slurry, e.g. the reaction products of the water-active constituents in the alloy. It is this latter gas which is controllably discharged in the above-described manner for equalization of gas pressures.

To facilitate such gas pressure equalization by the foregoing procedure, the slurry-forming step of the present process is performed by mixing alloy particles with cold water at one region, adjacent the lower end of the dust seal, and the slurry is then advanced to a second region, from which gas cannot pass to the slurry-forming region, for completion of the slurry-treating step by heating to effect complete neutralization of the alloy. While some gas is evolved upon initial exposure of the alloy to the cold liquid in the slurry-forming region, due to immediate partial reaction of water-active alloy constituents, such evolution of gas is retarded because of the low temperature of the water in this region, and a major proportion of the gas produced is evolved in the second, or slurry treatment region. The gas pressure adjacent the lower end of the dust seal is thus only that provided by the limited evolution of gas in the slurry-forming region. Specifically, then, this procedure provides generation of gas adjacent the lower end of the dust seal, i.e. in the slurry-forming region, sufficiently limited in rate of evolution for ready gas pressure control at this locality by regulated gas discharge, according to the above-described operation, while the major proportion of gas evolved from the slurry is produced in and separately discharged from the separate treatment region.

Further features and advantages of the invention will be apparent from the detailed description hereinbelow set forth, together with the accompanying drawing, which illustrates diagrammatically one preferred embodiment of the apparatus of the present invention.

Referring to the drawing, the apparatus in its illustrated embodiment is associated with the converter of a subhalide distillation system. Such a converter may comprise an upright vessel providing a confined converter chamber of elongated upright configuration, and having a gas inlet to a lower portion of the chamber and a gas outlet from the upper portion of the chamber. In operation, the converter chamber is maintained substantially filled, for at least a considerable portion of its vertical length, with granular aluminum-containing alloy, introduced e.g. through an aperture at the upper end of the chamber. Electrodes are disposed in the converter for contact with the granular alloy mass in the chamber, to heat the mass by passage of an electric current therethrough, and aluminum trichloride gas is introduced through the gas inlet, preferably in a continuous flow, to pass upwardly through the chamber for contact with the alloy granules to remove aluminum therefrom; the aluminum monochloride gas produced by trichloride-alloy reaction in the chamber, together with the unreacted portion of introduced trichloride gas, is withdrawn through the gas outlet for further treatment to obtain aluminum metal.

The lower portion of such converter structure, viz. the extremity thereof extending below the gas inlet, is shown in fragmentary elevational view in the drawing at 10, including the lower extremity of the converter chamber 11, shown as filled with a mass of granular alloy, the lower end of such mass being illustrated at 12. In accordance with preferred practice of the subhalide process, this latter portion of the alloy mass is composed of granules which have advanced downwardly through the converter chamber, undergoing reaction with trichloride gas, and which are thus substantially depleted of aluminum by the time they reach this extremity of the mass; i.e., these granules constitute an aluminum-lean residue, ready for discharge from the converter to accommodate fresh increments of unreacted alloy at the upper end of the converter chamber. The residue granules range in size from fine particles up to lumps e.g. as much as three inches in diameter, and may be partially adhered together, at this region of the converter chamber, in agglomerates of even larger dimension. They are at an elevated temperature (e.g. between 300° C. and 600° C.) and are surrounded and permeated by the aluminum trichloride atmosphere of the converter.

In the converter as shown, the lower end of the alloy mass 12 rests on a upright extractor cone 14, shown as having a fluted surface configuration, which provides the floor of the converter chamber and which is mounted on a vertical shaft 15. The shaft 15 may be driven by suitable means (not shown) to effect slow rotation of the cone, whereby the residue alloy granules resting thereon are carried past discharge aperture structure, here for simplicity shown as a single aperture 17 opening at one side of the converter wall. The rotary motion of the cone advances the granules through this aperture, while crushing any large agglomerates of adhering granules that have formed in the alloy mass, to reduce them to a size that will pass through the aperture; thereby the residue alloy granules comprising the lower end of the alloy mass 12 are expelled from the converter, e.g. in a substantially continuous fashion. It will be understood, of course, that the above-described details of converter structure, cone, discharge aperture configuration and the like are shown and set forth for illustrative purposes only, and that the present invention may be employed with alternative forms of such structures and devices, e.g. in association with converter discharge apertures of annular or other configuration.

As employed with a converter of the type shown, the apparatus of the present invention in its illustrated form includes a comminuting device, e.g. a rotary hammermill 20 of conventional design (shown only schematically), surrounded by an air-tight housing providing a comminution chamber 21 sealed from the atmosphere. Residue alloy granules are advanced from the converter aperture 17 to this chamber through a conduit 22, sealed from the atmosphere, communicating at its upper end with the aperture 17, and opening downwardly into the chamber 21. As shown, the aperture, conduit and chamber are mutually arranged in such manner that granules expelled through the converter aperture 17 fall by gravity through the conduit into the chamber, and thus into the path of the rotating hammermill blades; the blades then strike the falling granules to reduce them to pulverulent form. In conformity with conventional hammermill design, a screen 23 extends horizontally across the lower end of the comminution chamber 21, for control of particle size of the comminuted alloy passing downwardly from the chamber. That is to say, the particles of alloy comminuted by the hammermill fall through this screen and thus out of the comminution chamber; with a screen of appropriately selected mesh size particles of a size larger than a predetermined maximum dimension will be retained on the screen and thereby prevented from advancing further in the apparatus, until fully crushed.

Alloy passing through the screen 23 falls downwardly therefrom, e.g. through a conduit 25, also sealed from the atmosphere, into a dust reservoir 27. The dust reservoir comprises a housing providing a reservoir chamber sealed from the atmosphere, shown as having a cylindrical upper portion and a downwardly tapering frusto-conical lower portion 28 ending in an aperture 29 of restricted cross-sectional area. The present apparatus further includes a dust seal pipe 30, defining a confined dust seal region 31, sealed from the atmosphere and extending downwardly from the aperture 29 (which constitutes the upper extremity of the region 31) to a lower extremity 33. This region 31 is elongated in a vertical sense, and is restricted in cross-sectional area throughout its length; i.e. its vertically axial dimension is large with respect to its horizontal diameter. The conduit 25, reservoir 27, and seal pipe 30 are mutually disposed and adapted to permit downward passage of comminuted alloy particles, falling from the screen 23, into and through the reservoir chamber and the dust seal region 31.

At its lower end, the dust seal pipe 30 communicates with a feeder, illustrated as comprising a feeder screw 35, disposed to turn about a substantially horizontal axis, enclosed in a housing providing a feeder chamber 36 sealed from the atmosphere, and driven by suitable means, e.g. of conventional character, indicated generally at 38. The lower extremity 33 of this region 31 is open to the feeder chamber, so that comminuted alloy may pass from the region 31 into the feeder chamber. The screw 35 is in turn adapted to effect positive advance of alloy particles from the dust seal extremity 33 to and through an aperture 39 in the feeder chamber 36, when driven by the drive means 38. The feeder is further dimensioned and adapted to permit withdrawal of alloy particles from the dust seal extremity 33 only by such positive advance effected by the feeder screw when driven; thus the rate of advance of alloy particles from the region 31 is controlled by the drive rate of the feeder screw.

It will be appreciated that alternative feeder instrumentalities may be employed in the present apparatus, so long as such instrumentalities are enclosed within a housing providing a feeder chamber sealed from the atmosphere and communicating with the dust seal extremity 33; are adapted, when driven, to effect positive advance of comminuted alloy from the latter extremity to an aperture in the feeder chamber; and are further dimensioned and adapted to permit withdrawal of particles from the extremity 33 only by such positive advance effected by driving the feeder instrumentalities. Thus, for example, in place of the screw 35, a rotary table feeder of conventional character might be employed, viz. including a horizontal table, mounted on a drive shaft through which it may be rotated by suitable drive means, and disposed so that alloy particles will fall thereon from the dust seal extremity 33; and a stationary peripheral plough disposed to scrape alloy particles from the table, upon rotation of the latter, into and through an aperture corresponding to the aperture 39.

As a particular feature of the invention, the dust reservoir 27, dust seal pipe 30, and feeder structures (viz. screw 35, chamber 36 and associated structures and instrumentalities as described above) are mutually disposed and adapted to maintain the region 31 entirely filled with alloy particles, as an elongate, loosely packed mass or column of particles therein, while the alloy particles are advanced (e.g. in a continuous fashion) from the reservoir 27 through this region and to and through the feeder chamber aperture 39. Specifically, when the feeder screw 35 is at rest, i.e. not driven, alloy particles falling from the comminutor screen 23 through the conduit 25 and reservoir 27 will accumulate in the dust seal region 31, until it is filled with residue alloy particles in a loosely packed mass. Once such filled condition of the region 31 is established, it can be maintained by withdrawing particles from the lower end 33 of this region (i.e. by drive of the screw 35) at the same rate that particles falling from the comminutor accumulate at the upper end of the mass which fills the region 31. To this end, the screw drive means 38 is adapted to drive the screw 35 at a rate controllable to provide such withdrawal. The mass in the region 31 then constitutes a column of particles each moving downwardly under the force of gravity (i.e. as particles are withdrawn from the lower end of the region by the screw), but maintained in loosely packed relation within the region by control of the rate of alloy withdrawal therefrom, as explained above. The elongate mass of loosely packed particles in the region 31 as thus maintained constitutes a dust seal, effective to inhibit flow of gas from either extremity of the region to the other extremity thereof.

For assured maintenance of a dust seal column of particles in the region 31, the mass of particles extends above the upper extremity 29 of this region into the dust reservoir 27, forming a loosely packed bed 41 therein of diameter larger than the diameter of the dust seal region. That is to say, the initial accumulation of particles in the region 31 is permitted to continue until the particles have accumulated, above the region 31, to a predetermined level in the reservoir 27, and the mass is then maintained at this level by control of the rate of particle advance from the lower dust seal extremity 33 in the above-described manner. Such maintenance of a bed of particles in the reservoir above the dust seal region insures that the latter region will at all times be entirely filled with particles in a loosely packed mass providing a dust seal as described.

The drive rate of the screw, as mentioned above, is controllable to proportion the rate of particle advance from the lower end of the region 31 to the rate at which particles falling from the comminutor accumulate in the bed 41. For such control, level probe means, e.g. a plurality of sensors 43 in the dust reservoir 27, are provided in association with the screw drive means 38. Such level probes may be of conventional character, e.g. operating mechanically or on a resistance or capacitance principle, capacitance probes being presently preferred. These probes control the drive means 38 (for example through a control device represented at 44, of a type conventionally used with capacitance probes, connected to the drive means 38 as indicated at 45) and are adapted to effect automatic adjustment thereof responsive to changes in the level of accumulated alloy in the reservoir. Thus, when actuated by a change in the level of the bed 41, they advance or retard the drive rate of the screw 35 to vary the rate of alloy withdrawal from the dust seal extremity 33, in such manner as to maintain the bed at a predetermined level in the reservoir.

As will now be understood, the conduit 22, comminution chamber 21, conduit 25, reservoir 27, dust seal pipe 30, and feeder chamber 36 together define a continuous path, sealed from the atmosphere, through which the solid alloy residue passes from the converter aperture 17 to and through the feeder aperture 39. Aluminum trichloride gas from the converter chamber 12 escapes through the aperture 17, providing an aluminum trichloride atmosphere in the upper portion of the apparatus, i.e. in conduit 22, chamber 21, conduit 25, and reservoir 27 above the bed of alloy particles 41, although the dust seal column of particles in the region 31 prevents passage of this trichloride atmosphere beyond the reservoir; in addition, the alloy particles carry entrapped trichloride gas from the converter atmosphere through the dust seal region 31 and into the feeder chamber 36. Gaseous aluminum trichloride is therefore present throughout the path defined by the above-mentioned structures. If the temperature at any locality therein falls below about 180° C., the trichloride gas present at such locality will start to condense, viz. as a solid, and may tend to clog the system; accordingly, it is desirable to maintain the internal temperature of these structures somewhat above this minimum value. This may be accomplished by thermal insulation, preferably with the aid of positive and continuing application of heat, e.g. by means of a suitable fluid-circulating heat jacket of conventional design (not shown) surrounding the several structures through which the alloy passes between the converter aperture 17 and feeder chamber aperture 39.

The present apparatus further includes a quench tank 47, comprising a chamber sealed from the atmosphere and adapted to contain a body of aqueous liquid 48, e.g. water. As illustrated, the feeder chamber aperture 39 opens downwardly into this quench tank, so that alloy particles advanced from the feeder chamber through the aperture 39 by the screw 35 fall into the body of liquid in the tank. Means, e.g. a rotary blade 50 disposed within the tank 47 for immersion in the body of liquid 48, are provided for agitating the liquid and alloy particles together to form a slurry, which can be withdrawn from the quench tank through an outlet 52, e.g. a pipe sealed from the atmosphere. To facilitate replenishing the supply of aqueous liquid in the tank upon withdrawal of slurry therefrom, the tank structure includes a liquid inlet 53. A gas exhaust duct 54, opening from a locality in the tank above the body of liquid 48, is also provided, for withdrawal of gases evolved upon contact of the alloy particles with the liquid in the tank.

The slurry formed in the quench tank is advanced therefrom through the outlet pipe 52, e.g. by a pump 55 of conventional design, to a gas stripper tank 57. The stripper tank 57 comprises a chamber sealed from the atmosphere and adapted to contain a body of slurry, in which the slurry can be heated, e.g. by steam introduced directly to the slurry in the stripper tank under pressure through a steam line 58. Agitating means, such as a pair of rotary blades 60 disposed in the body of slurry in the stripper tank, are provided in the tank to promote reaction of the water-active constituents of the alloy with the aqueous component of the slurry liquid therein. The stripper tank is further provided with a gas outlet duct 61 (for withdrawal of gases produced by such reaction), and a slurry outlet pipe 63. After treatment of the slurry in the stripper tank is completed, it may be withdrawn through this latter pipe, e.g. by means of a pump 64, to a suitable disposal locality, such as an open-air slurry pond (not shown).

As will now be appreciated, there are three discrete atmosphere or gas pressure zones within the above-described apparatus. The first of these is in the region defined by the conduit 22, comminution chamber 21, conduit 25, and reservoir 27 above the bed 41 at the top of the dust seal column; this zone is filled with aluminum trichloride gas from the converter, as has been explained, at a gas pressure equal to that of the converter atmosphere, providing the gas pressure at the upper end of the dust seal column in the region 31. The second zone is below the dust seal column, including the region defined by the feeder chamber 36 and the quench tank 47 above the liquid level therein. This zone is filled with the gases evolved in the quench tank, due to mixture and reaction of alloy and water therein. Since the lower extremity of the dust seal region 31 opens to the feeder chamber 36, and the latter in turn opens through aperture 39 to the quench tank, the gas pressure in the quench tank communicates through the feeder chamber with the lower end of the dust seal column (i.e. at the extremity 33). The third zone is in the gas stripper tank 57 above the level of slurry therein, and is filled with gases evolved from the slurry in the stripper tank. As will be further appreciated, the dust seal in the region 31 inhibits passage of gas between the first and second zones mentioned above and thus desirably maintains them as separate regions, i.e. without intercommunication of gases therebetween. Furthermore, since the quench tank 47 and stripper tank 57 are connected only by a pipe filled with slurry, passing through the pump 55 to open into the stripper tank at a point below the liquid level in the latter, there can be no intercommunication of gases between the second gas pressure zone mentioned above (i.e. in the quench tank and feeder chamber) and the third zone (i.e. in the stripper tank).

To enhance the effectiveness of the dust seal column in preventing flow of gas in either direction through the region 31, it is desirable to maintain the gas pressures above and below the column substantally equal to each other. As has been explained, the gas pressure at the upper extremity of the dust seal column is provided by the aluminum trichloride atmosphere in the first gas pressure zone of the apparatus. The gas pressure at the lower extremity of the column is provided by the atmosphere of evolved gases from the quench tank in the second zone and is equal to the gas pressure in the quench tank. For achievement of the desired gas pressure equalization, the apparatus of the present invention in the form shown includes means for effecting the controlled discharge of gas from the quench tank, to maintain the gas pressure in the tank substantially equal to that in the reservoir 27 above the dust seal column.

Specifically, the quench tank gas exhaust duct 54 terminates in an annular valve seat 70 surrounding an aperture 71. The flow of gases from the quench tank through this aperture is controlled by a pressure-regulating valve generally designated 72, here shown (in purely diagrammatic illustration) as comprising a conventional sensitive differential pressure transmitter 73 and a power actuator 74 which is adapted to effect displacement of a valve rod 77. This valve rod is illustrated as extending from the power actuator 74 downwardly into a gas conduit 80 which communicates with the quench tank exhaust duct 54 through the aperture 71; the conduit 80 and duct 54 are mutually arranged so that the valve seat 70 opens into the conduit. The valve rod 77 terminates in a valve plug 81 disposed within the conduit 80 and adapted to seat in the annular valve seat 70.

As indicated in the drawing, the gas pressure in the reservoir 27 is communicated to the differential pressure transmitter 73 through a pressure line 84, which is desirably maintained filled with a suitable purge gas, i.e. by conventional means (not shown), since otherwise aluminum trichloride gas from the reservoir 27 would stand in the line 84 and might condense therein as a solid, blocking the line. A second pressure line 85, extending from the quench tank exhaust duct 54, serves to communicate the gas pressure in the quench tank 47 to the differential pressure transmitter. This transmitter, which is sensitive to differences between the respective pressures in the reservoir and quench tank, operates the power actuator 74 by conventional electrical or pneumatic means to shift the position of the valve rod 77 and plug 81 responsive to changes in the difference between these pressures, for control of gas discharge from the quench tank through the aperture 71 in such manner as to maintain these pressures substantially equal to each other. Thus, when the pressure in the quench tank 47 is greater than the pressure in the reservoir 27, the differential pressure transmitter 73 operates the power actuator 74 to displace the valve plug 81 away from the valve seat 70 so as to permit increased discharge of gas from the quench tank through the aperture 71 into the conduit 80 and thereby to lower the pressure in the tank. Conversely, when the gas pressure in the reservoir 27 is greater than that in the quench tank, the transmitter 73 operates the actuator 74 to displace the valve plug 81 toward the valve seat 70, reducing the discharge of gas from the quench tank. During continuous operation of the apparatus, gas is continuously evolved in the quench tank as a result of the mixing of alloy and water therein, so that when the exhaust of gas from the tank is thus reduced there is a fairly rapid buildup of gas in the tank, with a consequent rise in the gas pressure at the lower end of the dust seal column.

It will be understood, of course, that the instrumentalities comprising the valve 72 are herein shown and described in highly simplified form and for purposes of illustration, these structures being of conventional character and well known in the art. In general, it is desirable that the pressure-regulating valve device employed be highly sensitive to small changes in the pressure differential between the reservoir 27 and quench tank 47, since in accordance with presently preferred practice this pressure differential is maintained at a very small value, for example at not more than about one inch of water. Such high sensitivity is effectively provided by the conventional electrically or pneumatically operating devices referred to above.

In carrying forward the process of the present invention with apparatus of the character described, residue alloy granules expelled from the converter through the aperture 17 by the cone 14 are advanced by gravity through the conduit 22 to the comminution chamber 21. They fall from the conduit 22 through the comminution chamber in the path of the blades of the hammermill 20; the hammermill is rotated (by suitable drive means) at a constant rate, e.g. at high angular velocity, to reduce the falling granules to pulverulent form as the latter are struck by the hammermill blades. The comminuted alloy then passes out of the comminution chamber through the screen 23, oversize particles being retained on the screen. As will be understood the rate of hammermill rotation and the mesh size of the screen are mutually selected to provide particles within the optimum size range for performance of further steps of the process with the apparatus.

At the initial stage of operation, the feeder screw 35 is at rest, i.e. not driven, and thus the alloy particles falling from the screen 23 successively through the conduit 25, dust reservoir 27 and dust seal pipe 30 accumulate within the dust seal region 31 defined by the latter. This accumulation is permitted to continue until the particles form a loosely packed mass or column entirely filling the region 31 and extending upwardly therefrom into the reservoir 27 and a bed 41. When the accumulation of particles in the bed 41 has reached a predetermined level, the level probe sensors 43 are automatically actuated to initiate drive of the feeder screw 35, so that alloy is advanced from the lower end of the dust seal column 33. The level probes control the drive rate of the feeder screw, and thus control the rate of alloy advance from the lower end of the dust seal column, responsive to changes in the level of the bed 41 in the reservoir 27. In this way, a constant level of accumulated alloy is maintained in the reservoir 27, for assured maintenance of the dust seal column in the region 31 as a loosely packed mass of particles filling the region, i.e. the rate of advance from the lower end of the dust seal column is thus proportioned to the rate at which particles falling from the comminutor accumulate at the upper end of the dust seal column.

The feeder screw 35 effects positive advance of alloy particles from the lower extremity 33 of the dust seal column through the feeder chamber 36 and to and through the aperture 39. The particles fall through the aperture 39 into the quench tank 47, which has been partially filled with water introduced through the inlet 53 prior to the commencement of the operation, to provide a body of water 48 in the quench tank, into which the particles fall. The agitating blade 50, immersed in the body of water in the quench tank, is rotated on a shaft (by suitable means) to provide agitation and mixture of the alloy particles and water in the tank. Thereby a slurry is formed in the quench tank, with some evolution of gas, due to reaction between the water and the water-active constitutions of the alloy (e.g. producing methane and possibly some phosphine) and also due to release of gas from the converter atmosphere entrapped in the pores of the alloy particles.

Desirably, the water as introduced to the quench tank is at a comparatively low temperature. Merely by way of example, one presently preferred value for the slurry temperature in the quench tank is about 30° C. Because of this low temperature, the reaction between water and the water-active alloy constituents in the quench tank proceeds at only a moderate rate, and thus there is only a moderate evolution of gas in the quench tank. As a result, the gas pressure in the quench tank (and consequently in the feeder chamber 36 with which the quench tank communicates through the aperture 39) can be readily controlled, as by the pressure regulating valve 72. It will be appreciated that if the evolution of gas in the quench tank proceeded at a very rapid rate, the buildup of gas therein would create high gas pressures not readily controllable by such means, and might also have other side effects, such as fluidization of the dust seal column. Control of the gas pressure in the quench tank is also facilitated by feeding the alloy particles thereto at a relatively constant rate, such that the evolution of gas in the quench tank proceeds at a relatively constant rate.

The slurry formed in the quench tank is withdrawn therefrom and advanced to the stripper tank 57 through pipe 52, e.g. by means of the pump 55. The slurry enters the stripper tank and partially fills it. Steam under pressure is introduced to the slurry in the stripper tank through steam line 58, and blades 60 disposed in the stripper tank and immersed in the slurry therein are rotated, by suitable means to provide agitation of the slurry. The feed of steam to the slurry in the stripper tank serves to heat the slurry in the tank, for example (in accordance with a presently preferred mode of operation) to a temperature approaching 100° C. By the combination of heating and agitation in the stripper tank, reaction of the water-active constituents in the alloy with the water in the slurry is effected, and any remaining gas entrapped in pores of the alloy particles in the slurry is driven off. As will be appreciated, the quench tank and stripper tank temperatures referred to above represent presently preferred values only, and in practice the process can be carried out under other and different conditions of temperature as may be convenient or desirable.

The gaseous reaction products evolved in the stripper tank (e.g. methane and phosphine) and any other gases driven off from the alloy therein are withdrawn through the gas outlet 61, for disposal as desired. By way of example, these gases may be used as purge gases in locations (such as alloy storage hoppers) where it is desired to maintain a confined region free of air. For this purpose, they may be first treated to remove or neutralize undesired constituents; thus the gases passing through the outlet 61 may be dried, to remove water vapor, and subjected to treatment for oxidation of phosphine to phosphorous pentoxide followed by scrubbing to remove the latter as phosphoric acid. After treatment of the alloy-containing slurry in the stripper tank is completed, i.e. when reaction of water-active constituents in the alloy has been completed and substantially all gases have been driven off therefrom, the slurry is discharged through the outlet pipe 63, as by means of a pump 64, to a suitable disposal locality, e.g. an open air slurry pond. Since it has been completely neutralized in the stripper tank, it may be thus exposed to the open air without danger of evolutuion of toxic or otherwise undesirable gases, and may be safely and conveniently handled, as desired. In this way, discharge of the residue alloy from the converter to the open air in a safe, convenient manner is accomplished.

Desirably the foregoing process is carried forward in a substantially continuous manner. That is to say, as residue alloy granules are discharged from the converter by the cone 14 in a substantially continuous fashion, they are successively advanced by gravity through the conduit 22 to the comminution chamber 21, reduced therein to pulverulent form by the action of the hammermill, and advanced downwardly by gravity to the top of the bed 41 in the reservoir 27. The feeder screw 35 is driven continuously at a rate (regulated automatically by the level probes 43) equal to the rate of particle accumulation at the top of the bed 41, so as to withdraw alloy particles from the bottom of the dust seal column in the dust seal region 31 while the region 31 is maintained filled with particles in a loosely packed mass. Thus the individual particles accumulating in the bed 41 from the comminutor successively pass downwardly through the lower part of the dust reservoir 28, thence through the region 31, forming part of the dust seal column therein, and so, by positive advance effected by the feeder screw, through the feeder chamber 36 and the aperture 39 into the quench tank 47.

The alloy, continuously advancing into the quench tank, falls into the body of water 48, and is mixed therewith as a slurry. The slurry is continuously withdrawn from the quench tank through the pipe 52 to the gas stripper tank, while the liquid level in the quench tank is maintained substantially constant by successive increments of water through the inlet 53, i.e. to replenish the body of liquid in the quench tank as it is depleted by successive withdrawals of slurry as described. The slurry is continuously advanced to the stripper tank and there subjected to heat and agitation, as described, for complete reaction of water-active constituents, with evolution of gas. It is then discharged, i.e. in a substantially continuous fashion, through the outlet pipe 63, while the gaseous reaction products are led from the stripper tank through the outlet 61.

During such operation, the gas pressures at the respective upper and lower ends of the dust seal column (i.e. respectively in the dust reservoir 27 and the feeder chamber 36) are maintained substantially equal by the action of the pressure regulating valve 72, which effects controlled discharge of gases evolved in the quench tank 47 to maintain the pressure therein (and thus the pressure at the lower end of the dust seal column) substantially equal to the pressure at the upper end of the column in the manner hereinabove described. Such pressure control is facilitated because the evolution of gas in the quench tank is restricted to a moderate degree, as explained above, with the bulk or major portion of gas evolution occurring in the separate stripper tank 57, from which gas cannot communicate to the quench tank.

The dust seal column in the region 31 is effective to prevent aluminum trichloride gas, entering the apparatus through the aperture 17 together with residue alloy granules, from passing below the region 31 and thus escaping, e.g. through the conduit 54 in the quench tank. Similiarly, gases evolved in the quench tank (i.e. methane and phosphine) are prevented by the dust seal column from passing upwardly through the region 31 and thence upwardly into the converter through the aperture 17, where they might contaminate the converter atmosphere. As will now be appreciated, aluminum trichloride gas passes through the aperture 17 and fills the region defined by conduit 22, comminution chamber 21, conduit 25, and dust reservoir 27, but cannot escape from such region; thus, as soon as the pressure in the latter region becomes equal to the gas pressure in the converter chamber, there is substantially no further flow of aluminum trichloride gas from the converter, and thus no loss of aluminum trichloride gas in any progressive or continuing sense from the subhalide distillation system.

The efficacy of the dust seal column in preventing passage of gas either upwardly from the quench tank to contaminate the converter atmosphere or downwardly from the converter for loss of aluminum trichloride gas through the quench tank gas exhaust, is augmented by the pressure regulation described above. That is to say, becacuse the gas pressures at the opposite ends of the dust seal column are maintained substantially equal in the manner described, there is no strong tendency to gas flow in either direction, such as might overcome the sealing effect of the dust seal column.

In the light of the foregoing description, certain further specific procedural and structural details of the present invention may be readily understood. Referring specifically to the comminutor structure represented by the hammermill 20 and the screen 23, it will now be apparent that the reduction of alloy particle size effected therein serves two purposes: in the first place, it provides particles of a size sufficiently small to form an effective dust seal column in the dust seal region 31; and in the second place it facilitates mixture of alloy and water in the quench tank 47 to form a slurry, wherein the reduced particle size of the alloy increases surface exposure of the alloy to the water, for assured complete reaction of water-active alloy constituents in the stripper tank 57. As has been explained, the size of particles advanced into the system from the comminution chamber can be restricted, i.e. to less than a predetermined maximum dimension, by providing a sufficiently small mesh size screen 23. It has been found that superior dust seal operation is achieved when the maximum size of particles advanced from the comminutor is not more than 0.25 inch, i.e. corresponding to a standard 4 mesh Tyler screen, and accordingly it is presently preferred to use a screen having maximum apertures no larger than such mesh size. It has also been found that a maximum particle size not greater than 0.125 inch is particularly advantageous with respect to slurry formation, in that pumping of the slurry, e.g. through pipes 52 and 63, is facilitated if the particles in the slurry are within such maximum particle size; this latter maximum may therefore be regarded as a further desirable operating limitation in some instances.

At the same time, it is preferable to control the degree of comminution effected by the hammermill 20 so as to avoid the production of excessive fines, e.g. by suitably restricting the rate of hammermill rotation. As has been explained, the lower extremity of the dust seal region 31 opens to the feeder chamber 36, which in turn opens through aperture 39 to the quench tank 47, such that the gas evolved in the quench tank circulates upwardly through the feeder chamber to the lower end of the particulate dust seal column maintained in the region 31. This flow of gas may cause fluidization of the particles composing the dust seal column, and thereby inhibit the desired downward advance of alloy particles through the region 31, if the particles are excessively fine.

The dimensional relation between the maximum particle size of the comminuted alloy and the cross-sectional diameter of the dust seal region 31 is another important factor governing maintenance of the desired continuous advance of alloy particles through the latter region. In particular, if the region 31 is excessively narrow relative to the maximum alloy particle size, the particles may tend to clog or be held up in this region. It has been found that, for assured avoidance of such clogging, the cross sectional diameter of the region 31 should be at least 8 times as large as the maximum particle size of comminuted alloy.

Observance of the particle size minimum limitation to avoid fluidization is desirable because notwithstanding the pressure regulating effect of the valve 72 there will ordinarily be a slight pressure differential between the extremities of the dust seal column due to variations in the aluminum trichloride vapor pressure in the converter and also due to the relatively large quantities of gas evolved when the alloy is mixed with water in the quench tank. By way of example, a typical screen analysis of pulverulent alloy suitable for the present process as practiced with the above described apparatus is indicated in the following table, wherein reference is made to standard Tyler mesh sizes:

Table I

| | Percent |
|---|---|
| On 4 mesh | 0 |
| On 6 mesh | 13 |
| On 10 mesh | 19 |
| On 24 mesh | 17 |
| On 48 mesh | 12 |
| On 100 mesh | 17 |
| On 200 mesh | 14 |
| On 325 mesh | 6 |
| Through 325 mesh | 1.5 |

The sealing properties of such a dust seal column are indicated in the following table, which summarizes results obtained experimentally by passing a flow of nitrogen gas through a column of pulverulent alloy (of particle size as indicated in the above screen analysis) 4 inches in diameter and 4 feet high, with the resistance of the column to the gas flow determined by measuring the pressure drop:

Table II

| Mass flow of gas $(G/\phi)$: | Pressure drop (mm. of mercury per foot) |
|---|---|
| 5 | 6.5 |
| 10 | 14 |
| 20 | 30 |

In the foregoing table, $G$ = the gas rate, in pounds per hour per square foot;

$$\phi = \left(\frac{\rho}{0.075}\right)^{0.5}$$

and $\rho$ = the gas density, in pounds per cubic foot.

The following example, employing apparatus of the above described character, will serve further to illustrate the performance of the process embraced in the present invention:

Residue alloy, in granules and lumps ranging up to 3 inches in diameter, discharged from the converter of an aluminum subhalide distillation system, is comminuted in a hammermill having a screen with 0.25 inch openings, at the rate of 2000 pounds per hour. The screen analysis of the comminuted alloy is as indicated in the above Table I. The alloy particles, having a maximum diameter of less than 0.25 inch, are then advanced through a dust reservoir and a dust seal pipe 4 inches in cross sectional diameter and 6 feet in vertical length, and are further advanced into an 8 inch diameter screw feeder which passes them to the quench tank. There the alloy particles are mixed with 10 times their weight of cold water, forming a slurry which may for example be at a temperature of about 30° C. The retention time of the alloy particles in the quench tank is about 4 minutes; during this time gas is evolved, chiefly methane, at a rate ranging from about 20 cubic feet per hour to about 40 cubic feet per hour. Gas is exhausted from the quench tank automatically under the control of a pressure regulating valve, to maintain the difference of gas pressures at the respective upper and lower ends of the dust seal column as nearly equal as possible; preferably the difference between these pressures is maintained at a value less than 1 inch of water.

The slurry formed in the quench tank is advanced to the gas stripper tank, wherein the slurry is heated, for example to between 98° C. and 99° C., by introduction of steam, and is at the same time vigorously agitated to promote complete reaction between the water-active constituents of the alloy in the slurry and the water of the slurry. Slurry is retained in the stripper tank for approximately 45 minutes. The slurry is then discharged to an open air slurry pond.

Under the operating conditions set forth in the foregoing example, there may be a considerable pressure differential between the quench tank and the stripper tank. For instance, typically the pressure in the quench tank may be about 2 p.s.i., while the pressure in the stripper tank is desirably controlled to a higher value (for example, about 8 p.s.i.) as by regulating the discharge of gas from the stripper tank, to minimize the loss of water vapor from the latter. However, since a pump 55 is connected in the conduit between the quench and stripper tanks, this pressure differential does not interfere with the desired advance of slurry through the conduit, and in particular the stripper tank may be at either a higher or a lower elevation than the quench tank, as desired for convenience of arrangement of the elements of the system.

It will be understood that a complete residue alloy discharge system is illustrated and described above. Under some conditions of operation, especially when there is high aluminum extraction from the alloy in the converter, it is found that the evolution of gas from the alloy on exposure to water may be considerably lower than under other conditions as with alloy which has been less aluminum-extracted. In such circumstances, it may be possible to operate the above described system and method without use of the stripper tank and with direct discharge of slurry from the quench tank. However, it is important to include the stripper tank in the system, especially to take care of the less extracted (i.e. higher aluminum content) alloy discharged from the converter at the start-up of converter operation or during an interruption of the flow of aluminum trichloride gas through the converter.

It is to be understood that the invention is not limited to the operations and embodiments hereinabove specifically described, but may be carried out in other ways without departure from its spirit.

We claim:

1. In a method of discharging residue alloy from an aluminum subhalide distillation system having a converter region wherein said alloy is heated and exposed to aluminum halide gas, the steps of withdrawing successive quantities of said residue alloy from said converter region; advancing said quantities of alloy in particulate form through an elongated and laterally confined passage into an enclosed region, at a rate controlled to maintain said passage continuously filled with said alloy as a column of particles constituting a dust seal effective to inhibit flow of gas in either direction through said passage; admixing said alloy with aqueous liquid in said enclosed region to form a slurry wherein water-active constituents of said alloy react with said aqueous liquid to effect release of water-releasable gases from said slurry; and discharging gas from said enclosed region at a rate controlled to maintain gas pressure in said enclosed region substantially equal to gas pressure in said converter region.

2. In a method of discharging residue alloy from an aluminum subhalide distillation system having a converter region wherein said alloy is heated and exposed to aluminum halide gas, the steps of advancing successive quantities of said residue alloy from said converter region along an enclosed path to the upper extremity of a downwardly extending, elongated and laterally confined passage for downward advance of said alloy through said passage; comminuting said quantities of alloy in said path whereby said alloy is supplied to said passage in particulate form; advancing said quantities of alloy from the lower extremity of said passage into an enclosed region, at a rate controlled to maintain said passage continuously filled with said alloy as a column of particles constituting a dust seal effective to inhibit flow of gas in either direction through said passage; admixing said alloy with aqueous liquid in said enclosed region to form a slurry wherein water-active constituents of said alloy react with said liquid to effect release of water-releasable gases from said alloy; and discharging gas from said enclosed region at a rate controlled to maintain gas pressure in said enclosed region substantially equal to gas pressure in said enclosed path.

3. A method according to claim 2, wherein said alloy is reduced in said comminuting step to a particle size not greater than about 0.25 inch, and wherein the minimum cross-sectional diameter of said passage is at least greater than about 8 times the maximum particle size of said comminuted alloy.

4. In a method of discharging residue alloy from an aluminum subhalide distillation system having a converter region wherein said alloy is heated and exposed to aluminum halide gas, the steps of advancing successive quantities of said residue alloy from said converter region along an enclosed path to the upper extremity of a downwardly extending, elongated and laterally confined passage for downward advance of said alloy through said passage; comminuting said quantities of alloy in said path whereby said alloy is supplied to said passage in particulate form; advancing said quantities of alloy from the lower extremity of said path into an enclosed region, at a rate controlled to maintain said passage continuously filled with said alloy as a column of particles constituting a dust seal effective to inhibit flow of gas in either direction through said passage; quenching said alloy with aqueous liquid in said enclosed region to form a slurry; discharging gas from said enclosed region at a rate controlled to maintain gas pressure therein substantially equal to gas pressure in said enclosed path; advancing said slurry to a second enclosed region while preventing flow of gas between said second enclosed region and said first-mentioned enclosed region; and heating and agitating said slurry in said second enclosed region to promote reaction of water-active constituents of said alloy with said liquid whereby said alloy is rendered substantially free of water-releasable gases.

5. In a method of discharging residue alloy from an aluminum subhalide distillation system having a converter region wherein said alloy is heated and exposed to aluminum halide gas, the steps of withdrawing successive quantities of said residue alloy from said converter region; advancing said quantities of alloy in particulate form through an elongated and laterally confined passage to a second, enclosed region, at a rate controlled to maintain said passage continuously filled with said alloy as a column of alloy particles constituting a dust seal effective to inhibit flow of gas in either direction through said passage; and admixing said alloy with aqueous liquid in said enclosed region to form a slurry wherein water-active constituents of said alloy react with said aqueous liquid to effect release of water-releasable gases from said alloy providing gas pressure at the extremity of said column of particles adjacent said enclosed region.

6. In a method of discharging residue alloy from an aluminum subhalide distillation system having a converter region wherein said alloy is heated and exposed to aluminum halide gas, the steps of withdrawing successive quantities of said residue alloy from said converter region and directing said quantities of alloy along an enclosed path into an elongated and laterally confined passage; comminuting said quantities of alloy in said path whereby said alloy is supplied to said passage in particulate form; advancing the comminuted alloy through said passage to a second, enclosed region, at a rate controlled to maintain said passage continuously filled with said comminuted alloy as a column of particles constituting a dust seal effective to inhibit flow of gas in either direction through said passage; and admixing said comminuted alloy with aqueous liquid in said enclosed region to form a slurry wherein water-active constituents of said alloy react with said aqueous liquid to effect release of water-releasable gases from said alloy providing gas pressure at the extremity of said column of particles adjacent said enclosed region.

7. In a method of discharging residue alloy from an aluminum subhalide distillation system having a converter region wherein said alloy is heated and exposed to aluminum halide gas, the steps of withdrawing successive quantities of said residue alloy from said converter region and supplying said quantities of alloy in particulate form to the upper extremity of a downwardly extending, elongated and laterally confined passage for downward advance of said alloy through said passage; advancing said quantities of alloy from the lower extremity of said passage to second, enclosed region, at a rate controlled to maintain said passage continuously filled with said alloy as a column of particles constituting a dust seal effective to inhibit flow of gas in either direction through said passage; and admixing said alloy with aqueous liquid in said enclosed region to form a slurry wherein water-active constituents of said alloy react with said aqueous liquid to effect release of water-releasable gases from said alloy providing gas pressure at the lower extremity of said column of particles.

References Cited by the Examiner

UNITED STATES PATENTS

| 1,357,781 | 11/1920 | Koppers | 266—38 |
|---|---|---|---|
| 1,686,912 | 10/1928 | Glessner | 266—37 |
| 1,961,893 | 6/1934 | Wadman | 266—38 |
| 2,064,495 | 12/1936 | Queneau | 75—1 X |
| 2,090,191 | 8/1937 | Edhofer | 134—132 |
| 2,121,084 | 6/1938 | Kruh | 75—68 |
| 2,481,217 | 9/1949 | Hemminger | 75—26 |
| 2,638,424 | 5/1953 | Hansgirg | 134—25 |
| 2,721,795 | 10/1955 | McGauley et al. | 75—97 |
| 2,745,730 | 5/1956 | De Vaney | 75—1 |
| 2,747,988 | 5/1956 | Von Haken | 75—38 |
| 2,905,545 | 9/1959 | Cookston | 75—1 |
| 2,937,082 | 5/1960 | Johnston et al. | 75—68 |
| 2,951,036 | 8/1960 | Bodkin et al. | 134—25 |
| 3,034,884 | 5/1962 | Meyer | 75—1 |

BENJAMIN HENKIN, *Primary Examiner.*

DAVID L. RECK, *Examiner.*